(12) United States Patent
Barth

(10) Patent No.: US 10,491,143 B2
(45) Date of Patent: Nov. 26, 2019

(54) CIRCUIT FOR SELECTIVELY SUPPLYING MOTORS WITH ENERGY

(71) Applicant: WITTENSTEIN SE, Igersheim (DE)

(72) Inventor: Oliver Barth, Weikersheim (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 15/944,001

(22) Filed: Apr. 3, 2018

(65) Prior Publication Data

US 2018/0287520 A1 Oct. 4, 2018

(30) Foreign Application Priority Data

Apr. 3, 2017 (DE) .................. 10 2017 107 125

(51) Int. Cl.
| | |
|---|---|
| *H02P 1/54* | (2006.01) |
| *H02P 5/00* | (2016.01) |
| *H02P 5/46* | (2006.01) |
| *H02P 5/74* | (2006.01) |
| *H02M 5/275* | (2006.01) |
| *H02P 27/04* | (2016.01) |
| *H02P 27/06* | (2006.01) |

(52) U.S. Cl.
CPC .............. *H02P 5/74* (2013.01); *H02M 5/275* (2013.01); *H02P 27/04* (2013.01); *H02P 27/06* (2013.01)

(58) Field of Classification Search
CPC ............. H02P 5/74; H02P 5/275; H02P 27/04
USPC .......................................................... 318/34
See application file for complete search history.

(56) References Cited

U.S. PATENT DOCUMENTS

| 2012/0286712 A1* | 11/2012 | Tsuboi | H02K 11/33 |
| | | | 318/400.26 |
| 2016/0308478 A1* | 10/2016 | Sugiura | B62D 5/0463 |
| 2017/0201204 A1* | 7/2017 | Kawano | H02P 6/16 |

FOREIGN PATENT DOCUMENTS

| DE | 102007052232 | 4/2009 |
| DE | 102007052233 | 4/2009 |

OTHER PUBLICATIONS

German Search Report, dated Mar. 4, 2017, in connection with German Application No. 102017107125.3, 14 pages (Google English translation included).

* cited by examiner

*Primary Examiner* — Erick D Glass

(74) *Attorney, Agent, or Firm* — Meunier Carlin & Curfman LLC

(57) ABSTRACT

The invention relates to a circuit for selectively supplying precisely one motor of a plurality of motors with energy which is provided by precisely one converter. The circuit has a plurality of multiphase motor terminals for connecting motors, with precisely one multiphase converter terminal for connecting precisely one converter, and a plurality of electrical connections, wherein each of the electrical connections respectively comprises a plurality of phase lines, wherein each of the electrical connections is connected to the converter terminal, and wherein precisely one of the electrical connections is respectively connected to precisely one of the motor terminals, wherein precisely one MOSFET for selectively switching the respective phase line is respectively arranged in each phase line of an electrical connection.

13 Claims, 3 Drawing Sheets

CIRCUIT FOR SELECTIVELY SUPPLYING MOTORS WITH ENERGY

CROSS REFERENCE TO RELATED APPLICATION

This application claims priority to and benefit of German patent application DE 102017107125.3 filed Apr. 3, 2017, which is fully incorporated by reference and made a part hereto.

FIELD OF THE INVENTION

The invention relates to a circuit for selectively supplying one motor of a plurality of motors with energy and to a use of a circuit for selectively supplying a selected motor of a plurality of motors with energy.

BACKGROUND

In the prior art, a plurality of motors are often operated using an individual converter which controls or regulates, for example, the torque, the speed or the position of the respective motor. This can be the case, in particular, when the respective motors do not have to be operated at the same time. In other cases, it may even be advantageous if the respective motors cannot be operated at the same time. According to one example, drives of machines having positioning axes are not intended to be moved at the same time as motors for protective doors or tool changers.

In order to individually electrically connect or disconnect the motors to or from the converter, electromechanical relays having individual contacts for each motor phase are used, for example.

However, electromechanical relays may be expensive and have a large construction volume. In addition, the mechanical contacts may wear out with increasing operating time. In the case of switching operations with high currents, there is also the risk of the electrical contacts being welded.

Electronic switches, which can also be referred to as semiconductor switches or solid-state relays, have the advantage that they do not have any mechanical switching contacts and can therefore be switched in a bounce-free and wear-free manner.

A switch for electrically connecting and disconnecting a motor must generally be designed to safely disconnect the current flow. Field-effect transistors (FET), for example, can be used as semiconductor switches. FETs block the current in one current direction and are still conductive in the other current direction even in their off state. In order to disconnect or block a current in both directions, two FETs are connected in series in the prior art and are arranged in such a manner that the first FET blocks the current flow in one direction and the second FET blocks the current flow in the respective other direction. This is often referred to as a "back-to-back" arrangement.

On the one hand, this results in a large design and a high outlay for the circuit. On the other hand, additional electrical losses occur since the current must flow through two semiconductor switches.

SUMMARY

The object of the invention is to at least partially solve the problems from the prior art. In particular, the object of the invention is to provide selective control of a plurality of motors which enables operation with as few electrical losses as possible. The circuit should have a simple, compact design.

The object is achieved with the circuit according to claim 1 and a use according to the coordinate claims.

One aspect of the invention relates to a circuit for selectively supplying precisely one motor of a plurality of motors with energy. The energy is typically provided by precisely one converter, for instance a converter which is in the form of a frequency converter or an amplifier. The circuit has precisely one multiphase converter terminal for connecting precisely one converter. The converter is usually designed to convert an incoming AC voltage into an outgoing AC voltage which has a different frequency and/or amplitude. However, the converter may also be in the form of an inverter or may comprise the latter, the inverter typically being designed to convert a direct current into an alternating current.

The circuit comprises a plurality of multiphase motor terminals for connecting motors, for example multiphase motors, in particular for connecting three-phase motors. In some applications, it is advantageous to provide precisely one converter for a plurality of motors which are not operated at the same time. Accordingly, a plurality of motors can be operated using only one converter, which may result in lower costs or less maintenance work.

The circuit also has a plurality of electrical connections, wherein each of the electrical connections respectively comprises a plurality of phase lines. For example, a multiphase current can be transmitted via the respective electrical connection.

In typical embodiments, precisely one MOSFET for selectively switching the respective phase line is respectively arranged in each phase line of an electrical connection. The outlay needed to construct the circuit is reduced as a result of the fact that only precisely one MOSFET, rather than two, for example, is used. The term "MOSFET" also concomitantly includes power MOSFETs, in particular, in the present invention. A respective MOSFET can therefore switch a current flow in the respective phase line, for example.

Each of the electrical connections is also connected to the converter terminal, wherein precisely one of the electrical connections is respectively connected to precisely one of the motor terminals. MOSFETs have the advantage that they can be switched virtually without power since the current flow to be conducted is voltage-controlled.

A current flow is usually influenced by a gate potential, for example by applying a voltage to the gate. The MOSFET can switch a current by accordingly selecting the voltage at the gate. MOSFETs typically have a production-related intrinsic body diode which has a reverse direction and a non-switchable forward direction. The non-switchable forward direction of the body diode results in a MOSFET being able to block current in only one direction. The other direction remains conductive even when the MOSFET is not switched.

Circuit breakers which can conduct and block a current in a bidirectional manner are required, in particular, in AC applications, for example the operation of an AC motor. Solid-state relays for AC applications often have a back-to-back arrangement in applications which are not according to the invention, that is to say two MOSFETs are respectively arranged in series in the opposite reverse direction of the body diode.

In the present invention, precisely one MOSFET is arranged in each phase line of an electrical connection. An electrical connection typically comprises a plurality of phase lines for each phase of a multiphase current. In typical motors which are operated using circuits according to the invention, the phases, for example three phases, meet at a point, called the neutral point below. During operation, the currents typically cancel each other out at the neutral point. Multiphase motors, in particular three-phase motors, typically have a neutral point since the free ends of the motor windings are connected to the external conductors. Even in the case of only one MOSFET which is off or is not switched for each phase line, no significant current can flow into or out of a motor connected to the motor terminal since there is no closed circuit when the MOSFETs are off in all phases. This means, in particular, that only one MOSFET is respectively needed to connect or disconnect a current in the respective phase line. This makes it possible to achieve a more compact design which can be additionally cost-effective.

Another aspect relates to a use of a circuit in one of the typical embodiments described herein for selectively supplying a selected motor of a plurality of motors with energy.

Embodiments of the invention relate, in particular, to circuits for controlling a plurality of motors. The control comprises selectively supplying a selected motor with energy. The circuit may be, in particular, in the form of a motor controller for controlling multiphase motors, for example asynchronous motors for transport and conveying applications or synchronous motors for axles which are not operated at the same time in machine tools.

In typical embodiments of the invention, the circuit has a control module. The control module is set up to selectively switch the MOSFETs of precisely one electrical connection. The control module typically comprises a plurality of control terminals. One of the control terminals of the control module may be connected to a gate terminal of a MOSFET, for example. The control module typically has a voltage source which provides a voltage sufficient to switch the MOSFET. The control module can connect the voltage source to a MOSFET, for example via a switch. In particular, the voltage source can be selectively connected to all MOSFETs of precisely one electrical connection via the control module. This has the advantage that all MOSFETs of precisely one electrical connection can be switched using only one control terminal.

The control module may provide two switching positions, for example, for each control terminal. In the first switching position, all MOSFETs of precisely one electrical connection can be supplied with a voltage. In the second switching position, the voltage source is connected to a ground potential or an earth potential. The connection of the voltage source to the MOSFETs is disconnected in the second switching position.

In typical embodiments of the invention, the gates of the MOSFETs of in each case all phase lines of precisely one of the electrical connections can be connected to precisely one control terminal of the control module. The control module provides a voltage sufficient to switch the MOSFET. If the control module connects the gate of a MOSFET to the voltage source, the MOSFET turns on. In other words, the MOSFET is switched. One advantage is that the switched MOSFET can conduct alternating current. For example, an AC motor connected to the motor terminal can be supplied with current as a result.

In typical embodiments of the invention, the gates of the MOSFETs of in each case all phase lines for each electrical connection can be connected to precisely one control terminal of the plurality of control terminals of the control module in each case. A driver is usually used to switch more than one MOSFET using only one voltage source. In circuits according to the invention, a bootstrap circuit can be used as the driver. In typical embodiments, the control module has a bootstrap circuit. The voltage needed to switch the MOSFETs can therefore be obtained via the bootstrap circuit.

In typical embodiments of the invention, all source terminals of the MOSFETs of at least one of the electrical connections are respectively connected either to the respective motor terminal or to the converter terminal of the electrical connection. The MOSFETs of the respective electrical connection can be oriented in the same direction. For example, in a first electrical connection, all source terminals can be connected to a first motor terminal, in which case the MOSFETs in the first electrical connection are in the form of n-channel MOSFETs. In a second electrical connection, all drain terminals of a p-channel MOSFET, for example, can be connected to a second motor terminal. Typical embodiments have the advantage that all intrinsic body diodes of the MOSFETs have the same orientation in an electrical connection, as a result of which there is no closed circuit when the MOSFET is not switched.

In typical embodiments, the respective drain terminals are connected to the respective other terminal of the motor terminal and the converter terminal. In particular, all source terminals of the MOSFETs are respectively connected to the respective motor terminal in at least one of the electrical connections. For example, all three MOSFETs can have the same orientation in a first electrical connection for the purpose of operating a first three-phase motor, with the result that, in all three MOSFETs, the source terminal points towards the first motor and the drain terminal points towards the converter or vice versa. This arrangement can be repeated for the purpose of operating a second three-phase motor. If a sufficiently high voltage is applied to the gate of the three MOSFETs of the first electrical connection, said MOSFETs become conductive in a bidirectional manner. The first three-phase motor can be operated.

If the gate voltage is set to a sufficiently low potential or low voltage, the three MOSFETs of the first electrical connection turn off. Although the intrinsic body diode of a MOSFET would still conduct a phase current, a current cannot flow into or out of the motor as a result of the three-phase structure of the motor windings of a three-phase motor. The first three-phase motor is therefore electrically disconnected from the converter by the MOSFETs which are not switched and have the same orientation. The second three-phase motor can now be connected and can be operated by the converter.

Embodiments of the circuit according to the invention typically have MOSFETs with the lowest possible on-state resistance. The electrical losses during operation of the circuit can therefore be minimized. The MOSFETs typically have a minimum required dielectric strength. The required dielectric strength can be selected, for example, according to the highest voltage which occurs during operation of the plurality of motors. The dielectric strength is typically selected in such a manner that reliable operation is enabled at the highest voltages which occur. The highest voltage often occurs when one of the plurality of motors is operated using a generator or is driven and feeds back power. High voltage peaks can also be produced, for example, by the pulse width modulation (PWM) of a converter, for example in the event of a rapid voltage change or in the event of overshooting of the PWM signal.

Typical embodiments of the invention have an overvoltage limiter. The overvoltage limiter can limit the voltage applied between the drain and the source of a respective MOSFET. Typical overvoltage limiters comprise, for example, varistors or suppressor diodes, in particular bidirectional suppressor diodes, which become conductive in the reverse direction if a voltage to be limited is exceeded. Voltages to be limited comprise, in particular, voltages which briefly occur in the case of interference or when switching the phase currents. Voltage peaks which could occur between the terminals of the MOSFET can therefore be conducted past the MOSFET. For example, the currents resulting from the voltage peaks can be discharged to an earth potential via the voltage limiter. It is possible to prevent or minimize damage to the MOSFET.

In typical embodiments, in the case of at least one MOSFET, the voltage limiter can be connected to the drain terminal of the MOSFET. Alternatively or additionally, a further overvoltage limiter can be connected to the source terminal of the MOSFET. The overvoltage limiter can connect, for example, a terminal of the MOSFET to an earth potential, this connection becoming conductive if the voltage peaks to be limited are exceeded.

In further typical embodiments which can be combined with the embodiments described herein, at least one MOSFET is bridged by an overvoltage filter. The overvoltage filter is typically connected both to the gate terminal and to the source terminal of a corresponding MOSFET. The overvoltage filter conducts voltage peaks which briefly occur past the MOSFET and bridges the latter, as a result of which the MOSFET is additionally protected from damage. Typical overvoltage filters have elements such as varistors or suppressor diodes, in particular bidirectional suppressor diodes.

In typical embodiments of the invention, the circuit has a switchable earth connection to an earth potential. The switchable earth connection is typically connected to a phase line at a motor terminal. In particular, all phase lines of a motor terminal can be connected to a switchable earth connection. The switching of the switchable earth connection can establish an electrically conductive earth connection between the motor terminal and the earth potential. This is particularly advantageous when the electrical connection between the converter terminal and the motor terminal has been disconnected or is disconnected by driving the MOSFETs of the respective electrical connection, for example. A possible current flow from the motor terminal in the direction of the converter terminal can be discharged to an earth potential by switching the switchable earth connection. A current flow to be discharged can occur, in particular, when the electrical connection between the converter and a motor being operated is disconnected. Connecting a motor which has not been selected or has not been operated to an earth potential causes a dynamic braking torque to act on the motor which has not been selected, which braking torque is directed counter to a free rotational movement.

In typical embodiments of the invention, the switchable earth connection respectively comprises an earth switch, in particular one earth switch for each phase of the respective motor terminal. This arrangement can also be described as a dynamic brake. Earth switches may be in the form of earth semiconductor switches, in particular MOSFET earth switches, for example. In further typical embodiments, the earth switch of the switchable earth connection is switched via the control module of an electrical connection between the motor terminal and the converter terminal. In a first switching position for example, the control module can connect the gate terminals of the MOSFETs of all phase lines of the respective electrical connection to the voltage source. In the first switching position, it is possible to operate a connected motor which is supplied with energy via a connected converter. In a second switching position, it is possible to disconnect the connection between the gate terminal and the voltage source, the respective earth switches being switched in the second switching position. A selected motor can therefore be deselected via the control module, the dynamic brake braking the motor which is no longer selected.

If the individual phases of a multiphase motor which is not electrically operated are short-circuited with respect to an earth potential, a rotational movement of the motor generates a current. This is often referred to as generator operation of a motor. The kinetic energy of the rotational movement of the motor is converted into electrical energy. The rotational movement loses kinetic energy; the motor can be braked.

Embodiments of the invention typically have a converter which is connected to the converter terminal. The converter which is also referred to as an amplifier can be in the form of a frequency converter, for example. The converter is typically designed to convert an incoming AC voltage into an outgoing AC voltage which has a different frequency and/or amplitude. However, the converter can also be in the form of an inverter or can comprise the latter, the inverter typically being designed to convert a direct current into an alternating current.

Embodiments of the invention typically have motors, wherein a motor is respectively connected to the respective motor terminals of at least two of the electrical connections. A first motor, in particular a multiphase motor, for instance asynchronous or synchronous motors, or generally three-phase motors, can be connected to a first motor terminal. A second motor can be connected to a second motor terminal. The first motor and the second motor can be selectively supplied with energy by the converter. Typical motors which are used in embodiments of the invention have three phases which are connected in star or delta.

In typical embodiments of the invention, the converter may be in the form of a frequency converter, wherein the motors are in the form of three-phase asynchronous motors. In other typical embodiments, the converter may be in the form of a servo converter which, for example, can provide the motors with torque, position or speed regulation, the motors being in the form of three-phase synchronous motors.

Typical embodiments can be used as follows. One selected motor of a plurality of motors is selectively supplied with energy. The associated switchable earth connections at a motor terminal of a motor which has not been selected are turned on with respect to an earth potential. The selected motor is deselected. A motor which has previously not been selected can now be selected and operated.

Typical embodiments have the advantages that a plurality of motors which are not operated at the same time can be selectively supplied with energy. Arranging precisely one MOSFET in each phase line of an electrical connection in each case between a converter and the selected motor makes it possible to keep electrical losses as low as possible. Another advantage is a possible reduction in the overall size of the controller.

BRIEF DESCRIPTION OF THE FIGURES

The invention is explained below on the basis of the following figures, but the invention is not restricted to the embodiments illustrated in the figures.

DETAILED DESCRIPTION

Figure 1:
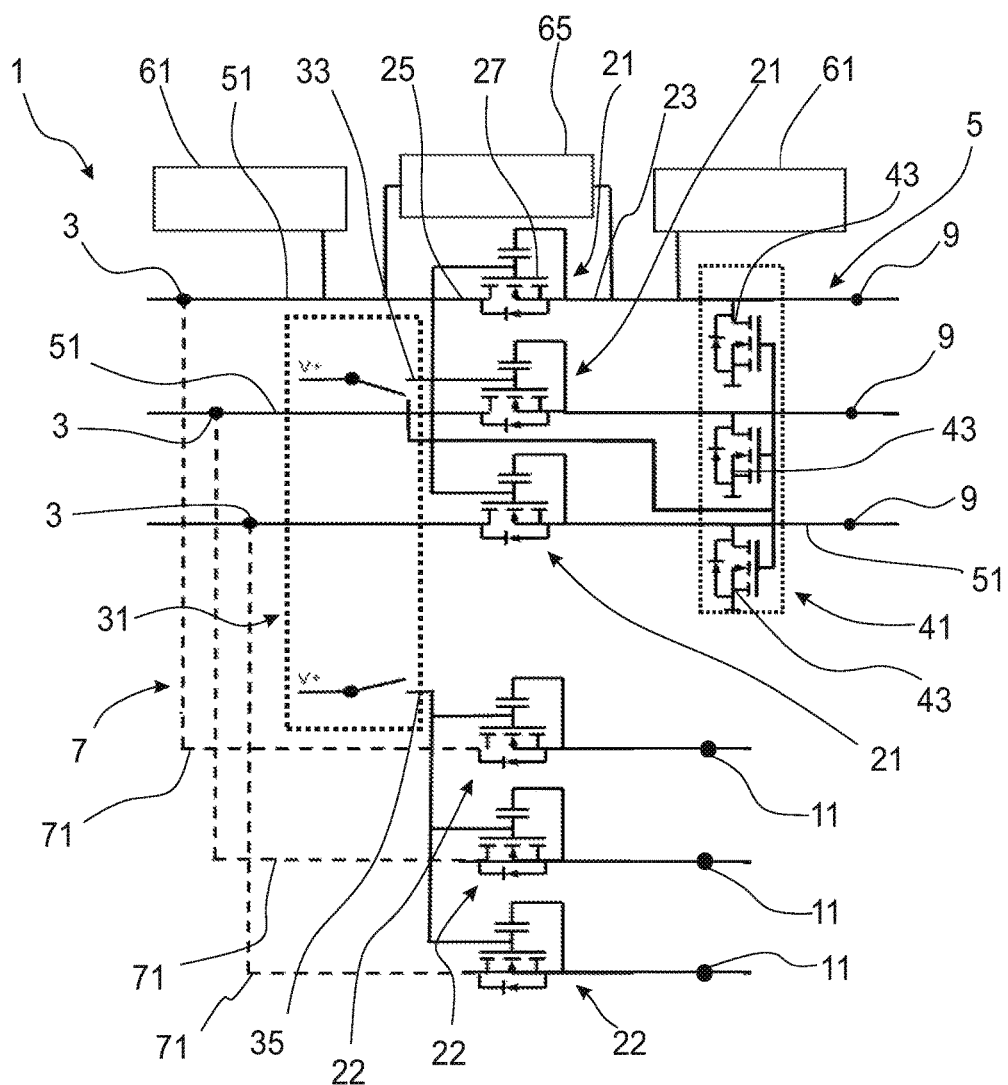
FIG. 1 shows a schematically illustrated circuit according to one embodiment described herein.

FIG. 1 schematically shows a circuit 1 for selectively supplying motors. The circuit 1 has a converter terminal 3 for connecting a converter.

A first electrical connection 5 comprises a first group of three phase lines 51. A second electrical connection 7 comprises a second group of three phase lines 71. The first electrical connection 5 connects the converter terminal 3 to a first motor terminal 9. Each of the three phase lines 51 in the first group is connected to the motor terminal 9. The motor terminal 9 has three phases.

The second electrical connection 7 connects the converter terminal 3 to a second motor terminal 11. The second group of three phase lines 71 has a similar design to the first group of three phase lines 51 of the first electrical connection 5.

A MOSFET 21 is arranged in each of the first three phase lines 51. Each MOSFET typically comprises a source terminal 23, a drain terminal 25 and a gate 27. As shown by way of example in FIG. 1, the respective source terminal 23 of the MOSFETs 21 is connected to the first motor terminal 9. The respective drain terminal 25 of the MOSFETs 21 is connected to the converter terminal 3.

The respective MOSFET 21 can be switched via the gate 27. The gates 27 are connected to a control terminal 33 of a control module 31. In particular, the gates 27 of all three MOSFETs 21 in the phase lines 51 can be driven, preferably together, via the control module 31.

In further typical embodiments, each gate of the MOSFETs in the respective group of phase lines can be individually driven. For example, the control module may have an individual control terminal for each gate.

In FIG. 1, the control module 31 has a voltage source. The voltage source may be formed integrally with the control module, for example. Alternatively, the control module 31 can be connected to an external voltage source. A voltage can be applied to the gates 27 via the voltage source using a first control terminal 33 of the control module 31 in order to switch the MOSFETs 21.

A motor connected to the first motor terminal 9 can be selected by the control module 31 by driving the MOSFETs 21. The control module 31 typically has a plurality of control terminals. A second group of MOSFETs 22 of the three second phase lines 71 can therefore be switched via a second control terminal 35.

If the motor has not been selected, the control module 31 switches the switches of a dynamic brake 41. In FIG. 1, the dynamic brake 41 comprises an earth switch 43, which is in the form of a MOSFET earth switch, for each of the three phase lines 51 in the first group.

The earth switches connect the first group of three phase lines 51 of the first motor terminal 9 to an earth potential. In a non-selected state of a connected motor, the latter can be braked or can be prevented from a free rotational movement. In particular, in the case of a motor which is connected to the motor terminal 9 and is not selected, a further motor connected to the motor terminal 11 can be selected, with the result that said further motor can be operated.

In other typical embodiments, a dynamic brake is also provided at a second motor terminal or at all motor terminals in each case. For example, this makes it possible to selectively operate a first motor at the first motor terminal, whereas a second motor or all further motors can be prevented from a free rotational movement by switching the respective dynamic brake.

In the embodiment shown in FIG. 1, one of the three phase lines 51 in the first group has an overvoltage limiter 61.

In typical exemplary embodiments, an overvoltage limiter is arranged in more than one phase line of an electrical connection. For example, an overvoltage limiter can be provided in each phase line.

In FIG. 1, an overvoltage limiter 61 is connected to the source terminal 23 of the MOSFET 21. A further overvoltage limiter 61 is connected to the drain terminal 25 of the MOSFET 21.

An overvoltage filter 65 bridges the MOSFET 21. The overvoltage filter 65 is connected to the drain terminal 25 and to the source terminal 63. In the case of a voltage peak to be limited, the overvoltage filter 65 can conduct a current past the MOSFET 21.

Figure 2:
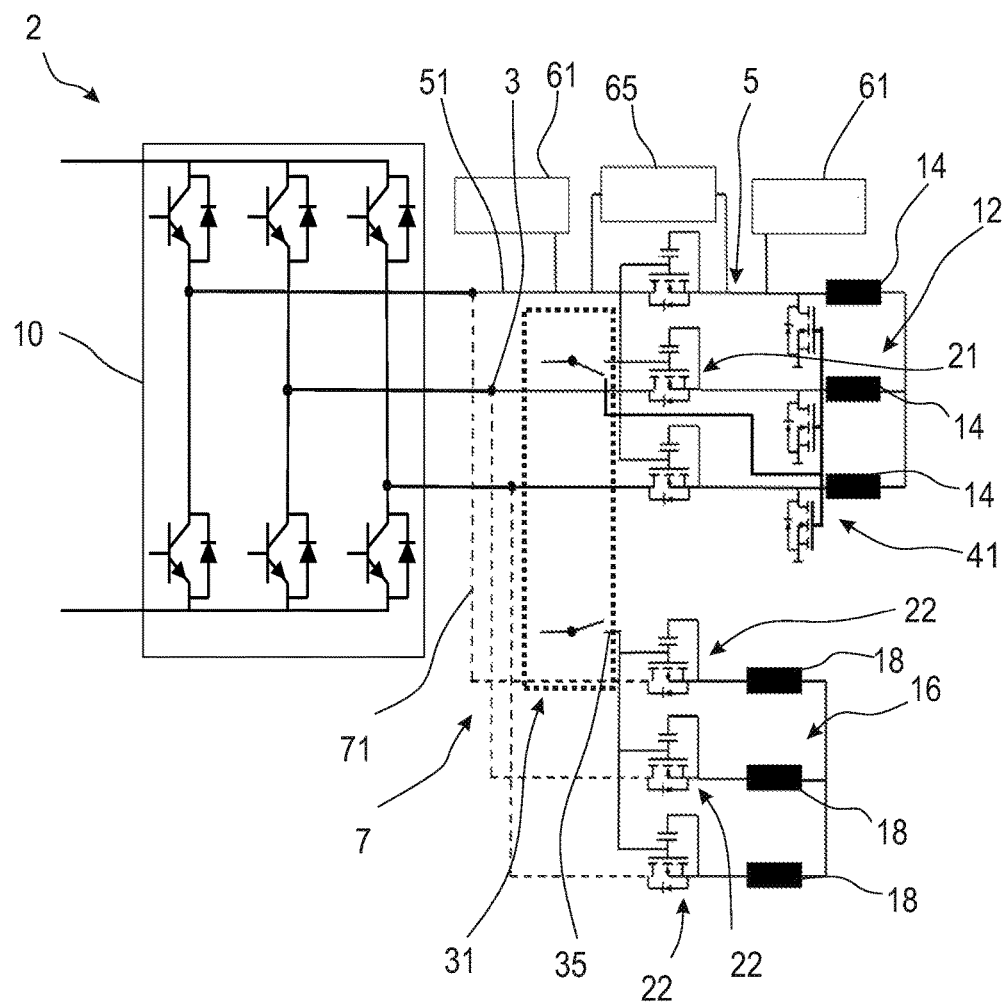
FIG. 2 shows a schematically illustrated circuit according to a further embodiment described herein.

FIG. 2 schematically shows a circuit 2 according to the embodiments described herein. In FIG. 2, identical reference symbols denote identical or similar parts to those in the exemplary embodiment in FIG. 1. Not all parts which have already been described in connection with FIG. 1 are described again in connection with FIG. 2. For a simpler overview, only one of the first three phase lines 51 and only one of the three second phase lines 71 are each provided with a reference symbol in FIG. 2.

In FIG. 2, motors are schematically represented by coils. A first motor 12 is connected to the first motor terminal 9 (FIG. 1) in FIG. 2. The first motor 12 comprises a coil 14 for each of the three phase lines 51 in the first group. Each of the coils 14 is respectively connected to precisely one of the three phase lines 51. A second motor 16 constructed in a similar manner to the first motor 12 is connected to the second motor terminal 11 (FIG. 1). The second motor 16 comprises a second coil 18 for each of the three phase lines 71 in the second group.

A converter 10 connected to the converter terminal 3 is designed to selectively supply the first motor 12 and the second motor 16 with energy.

An electrical connection which respectively comprises three phase lines for the individual phases of the AC voltage is generally available for each motor.

In FIG. 2, only one of the three MOSFETs 21 is provided with a reference symbol in order to provide a simple overview even if all MOSFETs of the first phase lines 51 are denoted with the respective reference symbols. The respective motor is selected via the control module 31. The control module 31 can drive, for example, the MOSFETs 21 of the three first phase lines 51 in order to operate the first motor 12. In this state, the second motor 16 has not been selected, that is to say it is not operated. If the first motor 12 is selected, the control module 31 can interrupt the supply of voltage at the gates 27 of the MOSFETs 21, with the result that the first motor 12 is no longer selected. In this non-selected state, there is no closed circuit in the first electrical connection 5. The first motor 12 is no longer supplied with energy via the converter 10. The control module 31 can then drive the second group of MOSFETs 22 of the second three phase lines 71. The gates of the MOSFETs 22 in the second group of three phase lines 71, in particular, can be connected to the voltage source of the control module 31 via the control terminal 35. The second motor 16 can now be operated via the converter 10.

Figure 3:
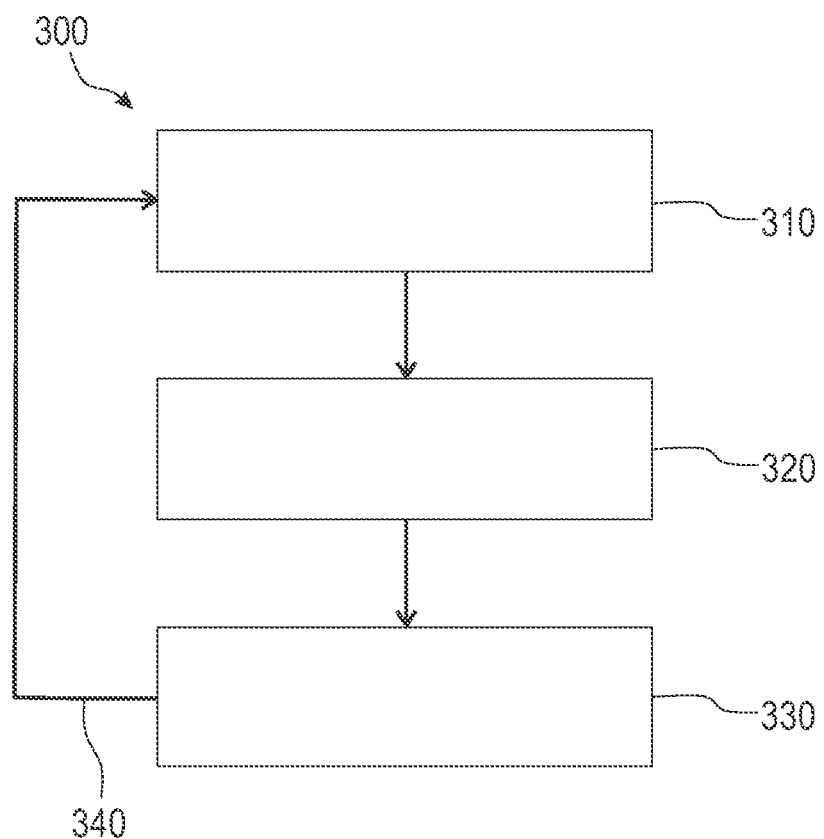
FIG. 3 shows a flowchart of a use of a circuit according to one embodiment described during.

FIG. 3 illustrates a use 300 of a circuit according to one embodiment described herein in the form of a flowchart.

One motor of a plurality of motors is supplied with energy (box 310) by driving the MOSFETs in one of the plurality of electrical connections. The driving is carried out in FIG. 3 via a control module which respectively switches all MOSFETs in the one connection of the plurality of electrical connections. Each of the plurality of electrical connections respectively comprises three phase lines according to the typical embodiment described in FIG. 3. The energy is provided by precisely one converter. In particular, a three-phase alternating current is provided for the purpose of operating a three-phase motor. The selected motor is operated.

In a next step, the MOSFETs in the one electrical connection of the motor operated in 310 are now no longer driven via the control module (box 320). In other words, the MOSFETs are now no longer turned on. The motor operated in 310 is no longer supplied with energy. The motor is deselected or is no longer selected.

In a further step, the switchable earth connections at the motor terminal of the motor which is no longer operated in 320 are connected to an earth potential (box 330). The earth connections can be switched at the same time as a motor is deselected.

In the use 300, the energy supply for the operated motor is first interrupted. The switches of the switchable earth connection in the phase lines of the motor terminal of the deselected motor are then switched via the control module. The three motor phases are each connected to an earth potential in 330. A current generated by the motor, for example as a result of generator operation, can be discharged via the earth connection. The motor is braked and is prevented from a free rotational movement.

In 330, the converter is ready to supply a motor with energy again. As represented by the reference symbol 340 in FIG. 3, this may be the motor previously operated in 310. In typical embodiments, after an operated motor has been deselected, another motor of the plurality of motors is selected.

The process of deselecting a motor typically comprises switching the earth switches of the dynamic brake arranged at the motor terminal of the deselected motor. In particular, the earth switches are switched via the control module. In a switching operation for example, a motor can therefore be deselected and can be connected to an earth potential via the earth switches of the dynamic brake.

The invention claimed is:

1. A circuit for selectively supplying precisely one motor of a plurality of motors with energy which is provided by precisely one converter, said circuit comprising:
   a plurality of multiphase motor terminals for connecting motors;
   precisely one multiphase converter terminal for connecting precisely one converter; and
   a plurality of electrical connections,
      wherein each of the electrical connections respectively comprises a plurality of phase lines,
      wherein each of the electrical connections is connected to the converter terminal, and
      wherein precisely one of the electrical connections is respectively connected to precisely one of the motor terminals;
   wherein precisely one MOSFET for selectively switching the respective phase line is respectively arranged in each phase line of an electrical connection the circuit further comprising a converter, which is connected to the converter terminal, and motors, wherein a motor is respectively connected to the respective motor terminals of at least two of the electrical connections, and wherein the converter is either in the form of a frequency converter and the motors are in the form of three-phase asynchronous motors or the converter is in the form of a servo converter and the motors are in the form of three-phase synchronous motors.

2. The Circuit according claim 1, further comprising a control module with a plurality of control terminals which is set up to selectively switch the MOSFETs of precisely one electrical connection.

3. The Circuit according to claim 2, wherein the gates of the MOSFETs of in each case all phase lines of precisely one of the electrical connections are connected to precisely one control terminal of the control module.

4. The Circuit according to claim 2, wherein the control module has a bootstrap circuit.

5. The Circuit according to claim 1, wherein the gates of the MOSFETs of in each case all phase lines for each electrical connection are connected to precisely one control terminal of the plurality of control terminals of the control module in each case.

6. The Circuit according to claim 1, wherein all source terminals of the MOSFETs of at least one of the electrical connections are respectively connected either to the respective motor terminal or to the converter terminal of the electrical connection.

7. The Circuit according to claim 6, wherein the respective drain terminals are connected to the respective other terminal of the motor terminal and the converter terminal.

8. The Circuit according to claim 1, wherein all source terminals of the MOSFETs in at least one of the electrical connections are respectively connected to the respective motor terminal.

9. The Circuit according to claim 1, wherein the phase lines at the motor terminals are each connected to a switchable earth connection to an earth potential.

10. The circuit according to claim 9, wherein the circuit is used for selectively supplying a selected motor of the plurality of motors with energy.

11. The circuit according to claim 10, wherein the switchable earth connections assigned to a motor terminal of at least one further motor which has not been selected are turned on with respect to an earth potential.

12. A circuit for selectively supplying precisely one motor of a plurality of motors with energy which is provided by precisely one converter, said circuit comprising:
   a plurality of multiphase motor terminals for connecting motors;
   precisely one multiphase converter terminal for connecting precisely one converter; and
   a plurality of electrical connections,
      wherein each of the electrical connections respectively comprises a plurality of phase lines,
      wherein each of the electrical connections is connected to the converter terminal, and
      wherein precisely one of the electrical connections is respectively connected to precisely one of the motor terminals;
   wherein precisely one MOSFET for selectively switching the respective phase line is respectively arranged in each phase line of an electrical connection;

wherein an overvoltage limiter is respectively connected to a drain terminal and/or to a source terminal of at least one of the MOSFETs.

13. A circuit for selectively supplying precisely one motor of a plurality of motors with energy which is provided by precisely one converter, said circuit comprising:
   a plurality of multiphase motor terminals for connecting motors;
   precisely one multiphase converter terminal for connecting precisely one converter; and
   a plurality of electrical connections,
      wherein each of the electrical connections respectively comprises a plurality of phase lines,
      wherein each of the electrical connections is connected to the converter terminal, and
      wherein precisely one of the electrical connections is respectively connected to precisely one of the motor terminals;
   wherein precisely one MOSFET for selectively switching the respective phase line is respectively arranged in each phase line of an electrical connection, wherein at least one MOSFET is bridged by an overvoltage filter.

* * * * *